I. J. COX.
PROCESS OF MAKING OLEUM.
APPLICATION FILED OCT. 7, 1910.
1,002,824.
Patented Sept. 12, 1911.
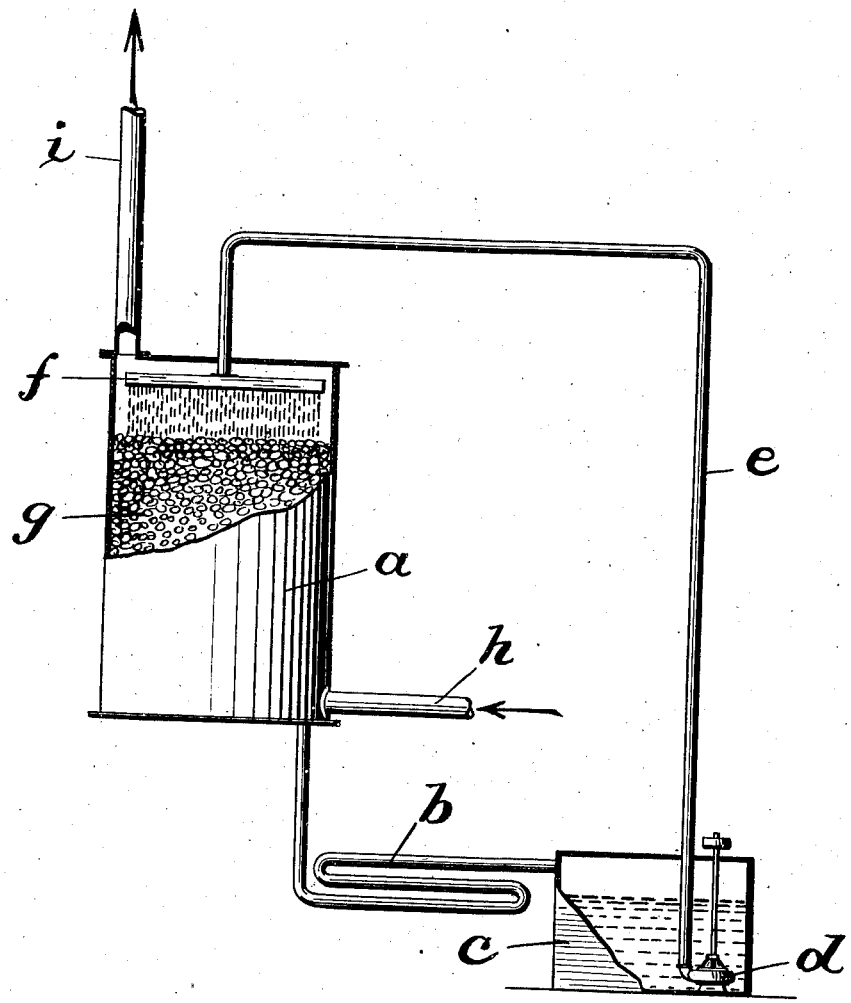
WITNESSES:
INVENTOR
Irving J. Cox
BY Harding & Harding
ATTORNEYS.

UNITED STATES PATENT OFFICE.

IRVING J. COX, OF DU PONT, WASHINGTON, ASSIGNOR TO E. I. DU PONT DE NEMOURS POWDER COMPANY, OF WILMINGTON, DELAWARE, A CORPORATION OF NEW JERSEY.

PROCESS OF MAKING OLEUM.

1,002,824.  Specification of Letters Patent.  Patented Sept. 12, 1911.

Application filed October 7, 1910. Serial No. 585,732.

*To all whom it may concern:*

Be it known that I, IRVING J. COX, a citizen of the United States, residing at Du Pont, county of Pierce, and State of Washington, have invented a new and useful Improvement in Processes of Making Oleum, of which the following is a full, clear, and exact description, reference being had to the accompanying drawings, which form a part of this specification.

The object of my invention is to modify and improve a known process of absorbing sulfuric anhydrid in sulfuric acid for the purpose of absorbing a substantially greater proportion of $SO_3$ in the gas, and of obtaining fuming acid of a substantially higher degree of concentration, than has heretofore been possible.

It is well known that by bringing gas containing sulfuric anhydrid in contact with a flowing body of sulfuric acid the latter will absorb a certain proportion of the sulfuric anhydrid, but it has been customary to absorb the sulfuric anhydrid in a comparatively small volume of acid, and as the absorption evolves heat, the result has been that the increase in temperature as well as the increase in concentration of the absorption acid as it passes through the absorber is accompanied by a rapid diminution in the ability of the absorption acid to take the sulfuric anhydrid.

I have discovered that by reducing the temperature of the gas and of the absorption acid to a definite point and by increasing the quantity of the absorption acid relatively to the quantity of sulfuric anhydrid in the gas to or above a certain proportion, a fuming acid is obtained of a concentration that has not heretofore been possible except to a very small percentage of the total output. In other words, both the absorption acid and the gas are used at a temperature that has been determined to be the most suitable for absorption, and the temperature increment as well as the concentration increment are distributed over so large a volume of the absorption acid that the acid remains continuously within the temperature zone most favorable for absorption, and moreover, the concentration of the absorption acid within the absorber is at no time appreciably higher than the concentration of the bulk of the circulating acid.

In carrying out my process I use an absorption tower, which may be empty, but which preferably contains quartz or other suitable acid-proof material in pieces over which the absorption acid flows in considerable volume. From the absorption tower the acid flows by gravity through the cooler—preferably made of a series of iron pipes and cooled by water or air—and thence to a circulating tank provided with a pump for lifting the acid to the top of the absorption tower. The gas may enter the tower at the bottom and pass out at the top, or vice versa. Both gas and absorption acid are led into the tower at a temperature between 85° and 115° F. and the ratio of the amount by weight of the absorption acid to the amount by weight of the sulfuric anhydrid in the gas which passes the tower in a given time is not less than 43:1. As absorption acid I use acid from any convenient source, preferably the strongest acid available in order that the desired maximum concentration may be the sooner reached. A charge of this acid is brought into the circulating tank and then, by means of the pump above mentioned, is circulated through the tower until the maximum concentration is reached. It is then removed from the circulating tank and replaced by a new charge.

In the drawings, the figure is a diagram of an apparatus in which the process may be carried out.

*a* is the absorber containing quartz or other acid proof packing *g*.

*b* is the cooler through which the acid passes on the way to the circulating tank *c*.

*d* is the pump, by means of which the acid is lifted, through the return pipe line *e*, to the top of the absorber, into which it is distributed by means of the distributer *f*.

*h* is the inlet for the gas and *i* the outlet.

The apparatus described is old and well known, as is also the process except that part thereof providing for the described regulation of the temperatures and relative quantities of the absorption acid and sulfuric anhydrid, upon which novel features depend the attainment of the objects of my invention hereinbefore set forth.

By means of the process hereinbefore described, I succeed in turning out fuming acid containing as high as 45 per cent. free $SO_3$ and at the same time absorb an average of 60 per cent. of the total $SO_3$ in the gas. This is accomplished in a single absorber.

Having now fully described my invention, what I claim and desire to protect by Letters Patent is:

1. The process of making oleum, which consists in causing sulfuric anhydrid at an initial temperature between 95° and 115° F. to be brought into contact with a body of absorption acid at an initial temperature between 95° and 115° F. in amount not less than forty three times the amount of sulfuric anhydrid by weight.

2. The process of making oleum, which consists in causing a flowing body of sulfuric acid at an initial temperature between 95° and 115° F. to absorb sulfuric anhydrid of a temperature within the same range, maintaining the ratio of the amount of absorption acid to the amount of sulfuric anhydrid in the gas acted upon at not less than 43:1 by weight, cooling the concentrated acid to a temperature within said range, and repeating the cycle until the desired maximum concentration is reached.

In testimony of which invention, I have hereunto set my hand at Tacoma, Wash., on this 28 day of September, 1910.

IRVING J. COX.

Witnesses:
    CHAS. S. LYONS,
    WALTER CHRISTIAN.